(No Model.)
C. P. CARLSON.
COUPLING FOR SHAFTS OR ROLLS.
No. 292,095. Patented Jan. 15, 1884.
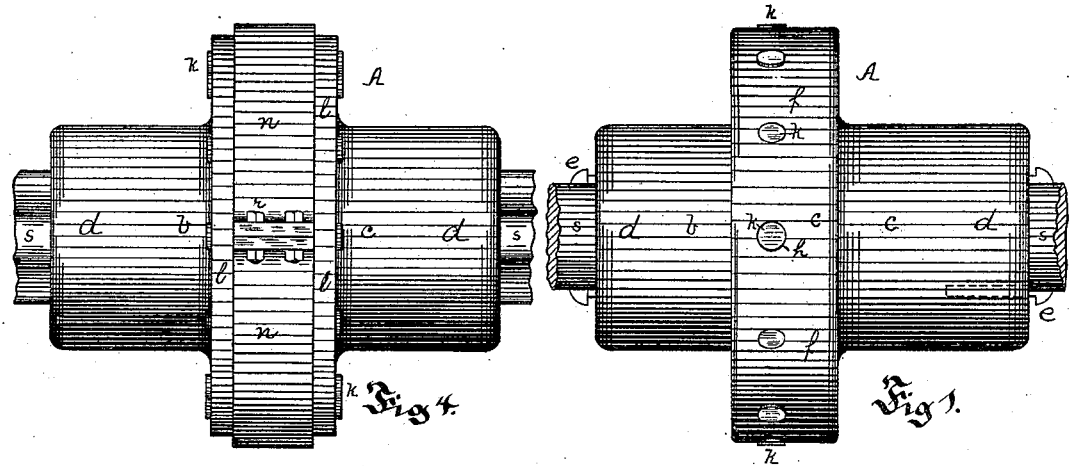
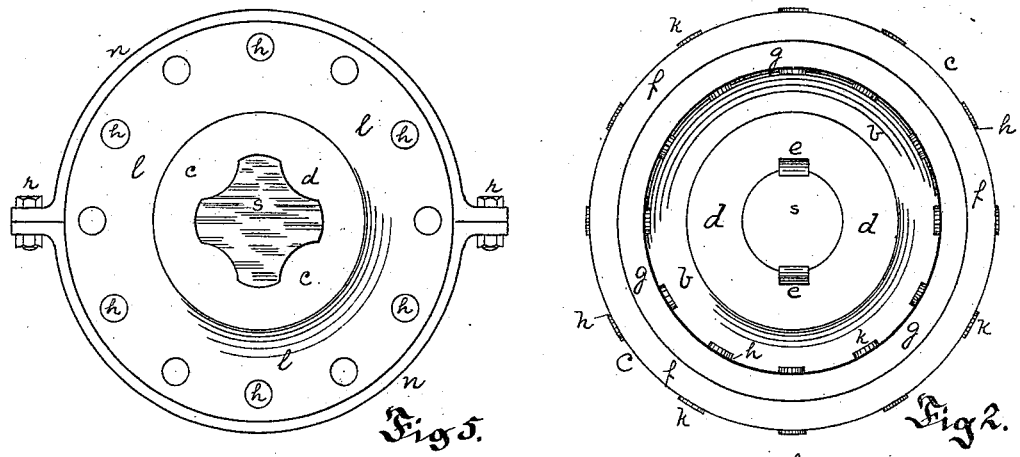
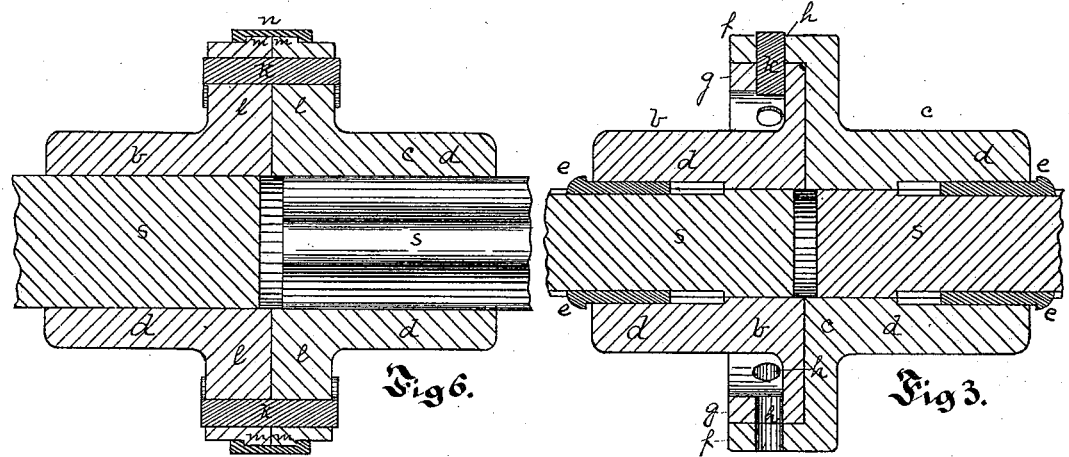
Witnesses.
F. G. May
J. M. Cooke
Inventor.
Charles P. Carlson
by James I. Kay
Attorney

# UNITED STATES PATENT OFFICE.

CHARLES P. CARLSON, OF McKEESPORT, PA., ASSIGNOR TO HIMSELF, AND THE NATIONAL TUBE WORKS COMPANY, OF BOSTON, MASS.

COUPLING FOR SHAFTS OR ROLLS.

SPECIFICATION forming part of Letters Patent No. 292,095, dated January 15, 1884.

Application filed May 2, 1883. (No model.)

*To all whom it may concern:*

Be it known that I, CHARLES P. CARLSON, of McKeesport, in the county of Allegheny and State of Pennsylvania, have invented a new and useful Improvement in Shaft and Roll Couplings; and I do hereby declare the following to be a full, clear, and exact description thereof.

My invention relates to couplings for shafts and rolls. The ordinary shaft or roll coupling is made of flanges secured to the shaft and bolted together, or of sleeves having angular interiors fitting over like angular parts on the shafts or rolls, and these couplings are generally so strong that if any heavy strain comes on the machinery connected the coupling will not yield, and consequently some part of the machinery is broken thereby.

The special object of my invention is to provide an efficient breakable coupling which is sufficiently strong to overcome the power required for all intended work, but which will break or yield at any time when such excessive strain comes upon the parts as would otherwise cause the breaking of some part of the machinery.

It consists, essentially, of a disk, flange, or similar coupling having a series of holes extending through the two parts thereof in proper relative position, so that wooden plugs or pins may be inserted within the said holes, and so connect the parts of the coupling, these wooden plugs being sufficiently strong to overcome and transmit the power required for the intended work of the shaft, roll, or other parts connected; but in case of such accident as would cause the breaking of a roll or other part the wooden plugs will be sheared off and the coupling disconnected, thus preventing the breaking of the machinery.

To enable others skilled in the art to make and use my invention, I will describe the same more fully, referring to the accompanying drawings, forming part of this specification, in which—

Figure 1 is a side view of one form of my improved coupling. Fig. 2 is a face view of the same. Fig. 3 is a longitudinal central section of the same. Fig. 4 is a side view of another form of my improved coupling; Fig. 5, a face view of the same, and Fig. 6 a longitudinal central section thereof.

Like letters of reference indicate like parts of each.

My improved shaft-coupling may be employed at any desired position suitable for the purpose, the most suitable for a coupling in a train of rolls being between the driving-shaft and the first set of pinions, though couplings of this construction may be employed between the different sets of rolls or in any other desired position in connection with power machinery.

The coupling A is formed of two parts, $b\ c$, having the hubs $d$ fitting over the shafts or spindles of the machinery, and keyed or secured thereon by the keys $e$ or any other desired manner. If desired, the hubs may be of angular shape, so as to fit over the spindles of rolls or other machinery, and be secured thereon without the employment of keys.

The coupling is shown in two forms, these two forms being considered sufficient to illustrate the principle of the coupling, though many different forms embodying the invention might be devised. In the forms shown in Figs. 1, 2, and 3, a male and female coupling is employed, the male coupling $b$ being adapted to fit within the annular flange $f$ of the female coupling $c$, and having an annular flange, $g$, extending backwardly around the hub $d$ of the coupling. Extending radially through these flanges $f$ and $g$ of the two parts of the coupling are a series of holes, $h$, the holes in the two flanges corresponding in position to each other, so that the wooden plugs $k$ may be driven through these holes, and so connect the two parts $b\ c$ together. The number of holes $h$ in the coupling will depend upon the strength of the wood pins employed, a sufficient number being employed to overcome and transmit the power necessary to perform the intended work, whatever it may be, the coupling shown having a series of twelve such holes or plugs, though it is evident that more or less may be used, as required.

In the form of the coupling shown in Figs. 4, 5, and 6, the two parts $b\ c$ of the coupling are provided with disks $l$, which meet or fit against each other, and through which the holes $h$ extend in the direction of or parallel to the axis of the coupling, so that the wood pins or plugs extend through the disks $l$ in a longitudinal direction, and so hold the two parts from turning and transmit the power from one part to the other.

In order to secure the two parts $b$ and $c$ from parting, I form around the disks $l$ the annular shoulders $m$, and secure around the disks the ring $n$, which has an annular recess adapted to receive these shoulders $m$, and which is bolted around the disk by means of the bolts $r$, this form of coupling being thus held against longitudinal strain by the ring $n$, and transmitting the rotary motion from one part to the other by means of the pins $k$, extending through the disks or flanges $l$.

When my improved roll or shaft coupling is employed, the shafts $s$ to be coupled are secured within the hubs of the parts $b$ and $c$ of the coupling by keying or in other suitable manner, and the two parts are brought together and the wood pins $k$ driven through the holes $h$. When the ring $n$ is employed, it is then bolted around the disks or flanges $l$, and the coupling is made. The power from the driving-shaft is then transmitted through the coupling, the wood pins being sufficiently strong to overcome and transmit the power necessary to drive the rolls and other machinery. In case, however, an accident should occur which brings a sudden and severe strain upon a roll, pinion, spindle, box, or other part of machinery, such as would cause a breaking of any such part, as the wood pins are the weakest part of the apparatus, it is evident that they will be sheared off, and so prevent the breaking of any of the parts. It is only necessary then to replace the pins so sheared off with others, and the apparatus is ready for operation again. When the coupling having male and female parts, as shown in Figs. 1, 2, and 3, is employed, the plugs or pins hold against both longitudinal and rotary motion, and the clamping-ring employed with the ordinary flange-coupling is dispensed with.

By the use of my improved breakable coupling I am thus enabled to prevent serious accident to the machinery by providing such a weak part as will yield before a sufficient strain can come upon any of the important parts of the machinery to cause the breaking thereof, and practical use has proven that by the employment of my improved shaft and roll coupling such accidents are almost entirely prevented.

It is evident that other forms of the coupling may be devised which will embody the invention above described, and these are of course included within my invention.

What I claim as my invention, and desire to secure by Letters Patent, is—

1. A shaft or roll coupling formed of two parts held together against rotary strain by means of one or more wooden pins extending through the parts thereof, substantially as and for the purposes set forth.

2. A shaft or roll coupling formed of a female part, a male part adapted to fit therein, and one or more pins extending radially through said parts to hold them against rotary strain, substantially as and for the purposes set forth.

3. In a shaft or roll coupling, the combination of the part $b$, having the flange $g$, part $c$, having the flange $f$, and series of holes $h$, extending radially through said flanges, and wood pins $k$, fitting within such holes, substantially as and for the purposes set forth.

In testimony whereof I, the said CHARLES P. CARLSON, have hereunto set my hand.

CHARLES P. CARLSON.

Witnesses:
WILLIAM A. DUNSHEE,
E. C. CONVERSE.